United States Patent
Yuan et al.

(10) Patent No.: US 8,127,656 B1
(45) Date of Patent: Mar. 6, 2012

(54) GENERAL PURPOSE PNEUMATIC POWER MODULE

(75) Inventors: Lifang Yuan, Stony Brook, NY (US); Nicolas Desimini, Huntington, NY (US)

(73) Assignee: Exelis, Inc., McLean, VA (US)

( * ) Notice: Subject to any disclaimer, the term of this patent is extended or adjusted under 35 U.S.C. 154(b) by 256 days.

(21) Appl. No.: 12/581,478

(22) Filed: Oct. 19, 2009

(51) Int. Cl.
*B64D 1/04* (2006.01)

(52) U.S. Cl. .... 89/1.54; 89/1.59; 244/137.4; 244/137.1; 244/76 R; 102/382; 102/383; 102/384

(58) Field of Classification Search .................... 89/1.54, 89/1.59; 244/137.4, 137.1, 76 R; 294/82.26; 102/382, 383, 384; 235/400, 401; 137/62.5
See application file for complete search history.

(56) References Cited

U.S. PATENT DOCUMENTS

| | | | |
|---|---|---|---|
| 4,204,456 A | | 5/1980 | Ward |
| 4,552,327 A | * | 11/1985 | Carter ........................ 244/137.4 |
| 4,608,907 A | * | 9/1986 | Ellis et al. .................... 89/1.815 |
| 5,029,776 A | * | 7/1991 | Jakubowski et al. ...... 244/137.4 |
| 5,583,312 A | | 12/1996 | Jakubowski, Jr. |
| 6,347,768 B1 | | 2/2002 | Jakubowski, Jr. et al. |
| 6,663,049 B1 | * | 12/2003 | Jakubowski et al. ...... 244/137.4 |
| 6,676,083 B1 | * | 1/2004 | Foster et al. ................ 244/137.4 |
| 6,758,441 B2 | * | 7/2004 | Jakubowsk et al. ........ 244/137.4 |
| 6,761,333 B2 | * | 7/2004 | Foster et al. ................ 244/137.4 |
| 6,764,048 B2 | * | 7/2004 | Jakubowski et al. ...... 244/137.4 |
| 6,811,123 B1 | * | 11/2004 | Foster et al. ................ 244/137.4 |
| 6,892,985 B2 | * | 5/2005 | Jakubowski, Jr. .......... 244/137.4 |
| 7,147,188 B2 | * | 12/2006 | Jakubowski et al. ...... 244/137.4 |
| 7,954,765 B2 | * | 6/2011 | Jakubowski et al. ...... 244/137.4 |
| 2004/0016848 A1 | * | 1/2004 | Jakubowsk et al. ........ 244/137.4 |
| 2004/0016849 A1 | * | 1/2004 | Jakubowski et al. ...... 244/137.4 |
| 2004/0108415 A1 | * | 6/2004 | Foster et al. ................ 244/137.1 |
| 2005/0151020 A1 | * | 7/2005 | Marotta et al. ............. 244/137.1 |
| 2006/0006288 A1 | * | 1/2006 | Jakubowski et al. ...... 244/137.4 |
| 2006/0060714 A1 | * | 3/2006 | Jakubowski et al. ...... 244/137.4 |

* cited by examiner

*Primary Examiner* — Michael J. Carone
*Assistant Examiner* — Samir Abdosh
(74) *Attorney, Agent, or Firm* — RatnerPrestia

(57) ABSTRACT

A pneumatic launch system includes a manifold that stores pressurized gas and releases the pressurized gas on command to sequentially open the store retention hooks and eject the store. The manifold includes an eject valve whose main chamber is part of the high pressure gas storage. A hook release valve is controlled by the eject valve for sequential operation of hook opening and store ejection. A manually selectable pitch valve provides pitch setting to proportion the gas delivered to the ejector cylinders. The manifold minimizes flow path restrictions and provides a fast actuation response with minimum variability to unlock the hooks and quickly eject the store.

12 Claims, 3 Drawing Sheets

GENERAL PURPOSE PNEUMATIC POWER MODULE

FIELD OF THE INVENTION

The present invention relates, in general, to airborne store suspension and release systems. More particularly, the present invention relates to a pneumatic launch system to release and eject a store from an aircraft.

BACKGROUND OF THE INVENTION

Military aircraft utilize racks located beneath the wings, the fuselage, and/or in the main weapons bay to carry and dispense stores upon command. Stores may be used to contain munitions, i.e. bombs, or to contain other material to be dropped from the aircraft, i.e. rockets or missiles, upon command from the cockpit, for example. Conventionally, an ejector rack includes a release mechanism which is activated to mechanically release and, subsequently, forcibly eject the stores from the aircraft. Most ejector racks, at one time, utilized pyrotechnic (explosive) cartridges which, upon ignition, generate high pressure gas for actuating the mechanical release mechanism, as well as providing high pressure gas to forcibly eject the stores from the racks mounted on the aircraft.

A characteristic of an ejector rack powered by a pyrotechnic (explosive) cartridge is a short, very high pressure pulse. This high pressure pulse allowed for the removal of the sear from the pedestal of the retaining hook and release of the store. The cartridges were somewhat unreliable, however, and their handling, maintenance, and costs were significant.

In order to avoid problems associated with the pyrotechnic cartridges, the ejector racks migrated to cold gas (pneumatic) systems. As such, an ejection system includes an on-board source of pressurized gas, a suspension mechanism for mounting the store on the aircraft, and an actuation system for driving the release mechanism between closed and open positions. By using compressed air to activate the ejector pistons and push the store through the air stream, pneumatic ejection racks have many advantages over traditional ejection racks which use pyrotechnic cartridges. The pneumatic ejection racks take advantage of the elimination of pyrotechnic cartridges and hazardous waste disposal, reduce the need for maintenance and spare parts, and have a longer life span thereby enhancing life cycle cost and overall system affordability.

The application of the pneumatic technology to the airborne store suspension and release systems is known in the prior art. One of the earliest examples is in U.S. Pat. No. 4,204,456 to Ward in 1980, titled Pneumatic Ejector for Bomb, which discloses a pneumatically operated piston with a radial clearance to the gas tight cylinder to allow for charging of the air or other gas into both sides of the piston. Ejection is then achieved by using a solenoid controlled valve to release gas pressure from the lower side of the piston at a faster rate than the leakage past the piston. More recent art on pneumatic racks is presented by Jakubowski et al., in U.S. Pat. No. 7,147,188 in 2006, titled Aircraft Store Ejector Rack Systems And Methods, which discloses a sequential operation of opening store retention hooks and releasing pressurized gas to eject the store by means of a staged actuator assembly.

Such pneumatic actuation systems include an accumulator for receiving and storing pressurized gas from a source, which may or may not be located on board the aircraft. Actuation of a control valve causes a primary valve to move from a closed position to an open position. This action vents the pressurized gas from a lower side of a hook release piston to move the hook release piston downward to unlock the store retention hooks. Subsequent opening of the primary valve releases the pressurized gas to ejector cylinder to eject the store. The pressure inside the ejector cylinders prevents automatic resetting of the ejector pistons to the original positions and must be vented after store release to allow the ejector pistons to retract to the original positions for the next store to be loaded.

The pneumatic ejection system includes an accumulator, or a pneumatic power module (PPM). The PPM represents one of the largest and highest cost components in an ejector rack assembly. The PPM is a single unit which combines a pressure storage reservoir with a valve assembly or valve manifold. The first stage of the valve assembly disengages the sear from the pedestal of the retaining hook, thereby allowing release of the store. The second stage of the valve assembly opens the path for the pressurized gas to the ejector pistons, thereby ejecting the store away. The complication is in avoiding flow restrictions to enable faster and more consistent valve response times and higher store ejection velocity, in an energy-efficient manner.

As will be explained, the present invention provides an efficient valve manifold design, utilizing few parts, for a pneumatic ejection system. The valve manifold design of the present invention minimizes flow path restrictions and provides a fast acting valve actuation response with minimum variability to unlock the hooks and eject the store. The present invention also allows the de-energized eject valve to quickly return to the closed position by the combined forces of the spring and the pressure in its main chamber. The quick closure of the eject valve optimizes the residual pressure in the vessel and prevents gas flow downstream of the eject valve. The eject valve at the closed position also vents the hook release valve and ejector cylinders so that the ejector pistons can automatically reset to the original positions after store release. The ejector pistons and ejector cylinders are then ready for the next store to be loaded.

SUMMARY OF THE INVENTION

To meet this and other needs, and in view of its purposes, the present invention provides a pneumatic launch system including an eject valve for forcibly ejecting a store from an aircraft and a hook release valve for releasing a hook of the store. The eject valve communicates with the hook release valve to actuate the hook release valve. A pressurized vessel is in fluid communications with the eject valve for setting a pressure level of fluid in the eject valve at a pressure level of the pressurized vessel. The pressure level of the fluid in the eject valve actuates the hook release valve to release the hook, and releases fluid to sequentially eject the store. The pressure level of the fluid is effective in shortening the period of time to release the hook and to eject the store.

Another embodiment of the present invention provides a valve manifold for a pneumatic launch system. The valve manifold includes an eject valve and a hook release valve coupled to each other. The eject valve is configured to actuate the hook release valve and release a hook of a store. Sequentially, the eject valve is configured to eject the store, after releasing the hook. The valve manifold may include an eject valve which is in fluid communication with an on-board pressure vessel and is configured to hold a pressurized fluid within a main chamber of the eject valve. The pressure level of the fluid in the eject valve is used to actuate the hook release valve and sequentially eject the store. This effectively shortens the period of time to release the hook and to eject the store.

In a further embodiment of the present invention, the valve manifold contains an eject valve which is normally closed by a spring force and pressure of a fluid in the main chamber of the eject valve. The eject valve is activated by energizing an eject valve solenoid, which releases a fluid from a pressure vessel to a pilot chamber in the eject valve. The eject valve is deactivated by de-energizing the eject valve solenoid, which vents the pilot chamber of the eject valve. The release of fluid to eject the store is controlled by an adjustable pitch valve which provides various pitch settings and ratios to control the fluid delivered to eject the store. The valve manifold may further provide an input port from a pneumatic source, an output port to ejector cylinders, and an output port to a reversible in-flight lock (RIFL) actuator which enables and disables the eject valve.

Furthermore, the present invention includes a method of ejecting a store from an aircraft. The store may be ejected by the steps of: (a) maintaining a pressure level of an eject valve at a pressure level of a pressurized vessel, wherein the pressurized vessel communicates fluidly with the eject valve; (b) releasing high pressure fluid from the pressurized vessel to the eject valve, causing the eject valve to activate, and transmitting the pressure maintained in the eject valve to a hook release valve; (c) actuating, by the hook release valve, a hook release mechanism of the store, after transmitting the pressure level from the eject valve; and (d) sequentially releasing fluid from the eject valve to ejector cylinders for ejecting the store. The method for ejecting the store may further provide that step (b) of transmitting the pressure level includes directing fluid from the eject valve to a piston of the hook release valve; and step (c) of actuating includes forcing the piston to interact with a hook release mechanism to release a retention hook. The action of the piston opens a port for fluid communication between the eject valve and the ejector cylinders.

It is understood that the foregoing general description and the following detailed description are exemplary, but are not restrictive, of the invention.

BRIEF DESCRIPTION OF THE FIGURES

The invention may be understood from the following detailed description, when read in connection with the accompanying figures.

DETAILED DESCRIPTION OF THE INVENTION

Figure 1:
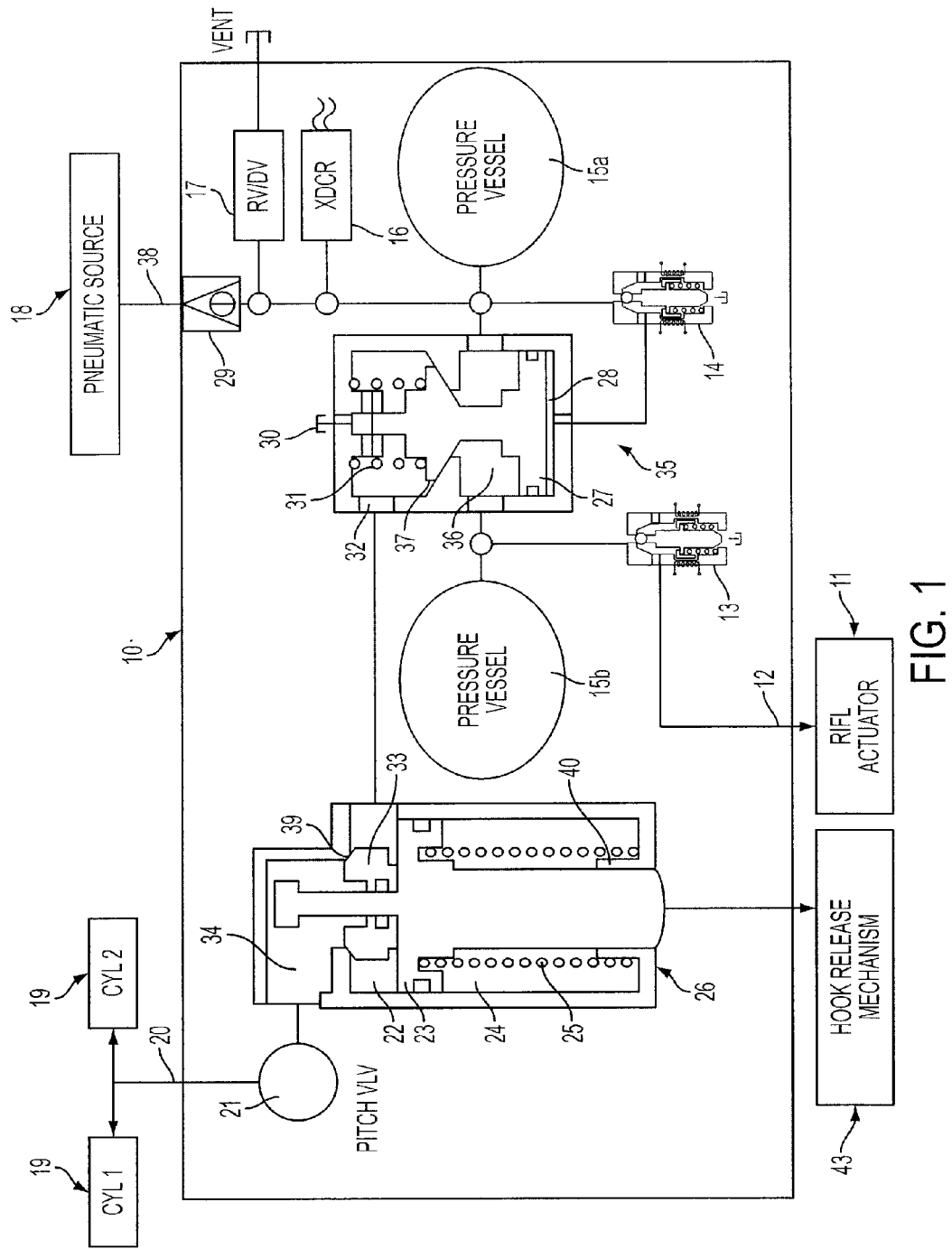
FIG. 1 is a schematic view of the pneumatic launch system of the present invention.

FIG. 1 is a schematic view of the pneumatic launch system 10 of the present invention. The pneumatic launch system 10 is a valve manifold that includes an eject valve 35, a hook release valve 26, and a pitch valve 21. As shown in the embodiment, the valve manifold is integral with a pressure vessel 15. The pneumatic launch system 10 stores pressurized gas received from a pneumatic source 18 and, when commanded, releases the stored gas to the hook release valve 26 to sequentially open the hooks and release the gas to the ejector cylinders 19 to launch the store. The pneumatic source 18 can be a pre-charged higher gas pressure vessel or directly, a compressor. The pressurized gas in the pneumatic launch system 10 is stored in both the pressure vessel 15 and the annular section 36 (main chamber) of the eject valve 35 to make full use of the space inside the manifold and provide a flow path with minimum restrictions. The flow restriction between the pressure vessel 15 and the eject valve main chamber 36 is negligible. Actuation of the eject valve 35 releases the high pressure gas directly into the hook release valve 26 and then sequentially into the ejector cylinders 19. This provides a more compact and less restrictive flow path to the ejector cylinders than if the high pressure gas is stored only in the pressure vessel and/or has to pass through the restrictions in the eject valve upon release.

The inlet path of the pneumatic launch system 10 contains a check valve 29 to prevent reverse flow from the pneumatic launch system 10 to the pneumatic source 18, a pressure/temperature transducer 16 to monitor the pressure and temperature, and a mechanical over-pressure relief and manual dump valve 17 for safety and servicing purposes. A pitch valve 21 which provides various pitch settings is used to control outlet gas flow and also ratios the gas delivered to the ejector cylinders 19. There is also an outlet port 12 from the pneumatic launch system 10 to the RIFL (Reversible In-Flight Lock) actuator 11 which is a safety device precluding inadvertent store release when the RIFL is unarmed.

The pneumatic launch system 10 may include an eject solenoid valve 14 and a RIFL solenoid valve 13. The RIFL actuator 11, actuated by the RIFL solenoid valve 13, opens the safety blocker (not shown) that prevents the hooks from opening. The eject valve 35, which is normally closed by a spring 31 and the high pressure gas in the main chamber 36, seals the high pressure gas and vents the hook release valve 26 and the ejector cylinders 19. When the eject solenoid valve 14 is energized, the high pressure gas from the pressure vessel 15 is directed through the solenoid 14 to the pilot chamber 28 of the eject valve 35. The net pressure force acting on the eject valve pilot piston area 27 and the seating area in the main chamber 36 causes the eject valve 35 to lift off its seat 37, closing the vent port 30 and directing flow via launch port 32 to the hook release valve 26. Substantially immediately, the high pressure gas stored in the pressure vessel 15 and the annular section 36 of the eject valve 35 is released to the hook release valve 26. The high pressure gas pushes the hook release piston 23 to move a required distance to open the store retention hooks via a hook release mechanism 43, then engages the sequence valve 33 to lift the sequence valve 33 off its seat 39 and directing flow via launch port 32 to the ejector cylinders 19. The hook release piston 23, after engaging the sequence valve 33, travels an additional distance before contacting the sleeve 40, at which time it fully opens the sequence valve 33 and allows high pressure gas to flow rapidly into the ejector cylinders 19 and provides the store with the required exit velocity.

Actuation of the eject valve 35 and then the hook release valve 26 with the high pressure gas allows quick response to close the eject valve vent port 30 and activate the hook release piston 23. This action results in less time to complete ejection than if the high pressure gas has to be vented from the lower side of the hook release piston as in prior art, or if the eject solenoid valve, which has small orifice, directly supplies the gas to stroke the hook release piston.

Figure 2:
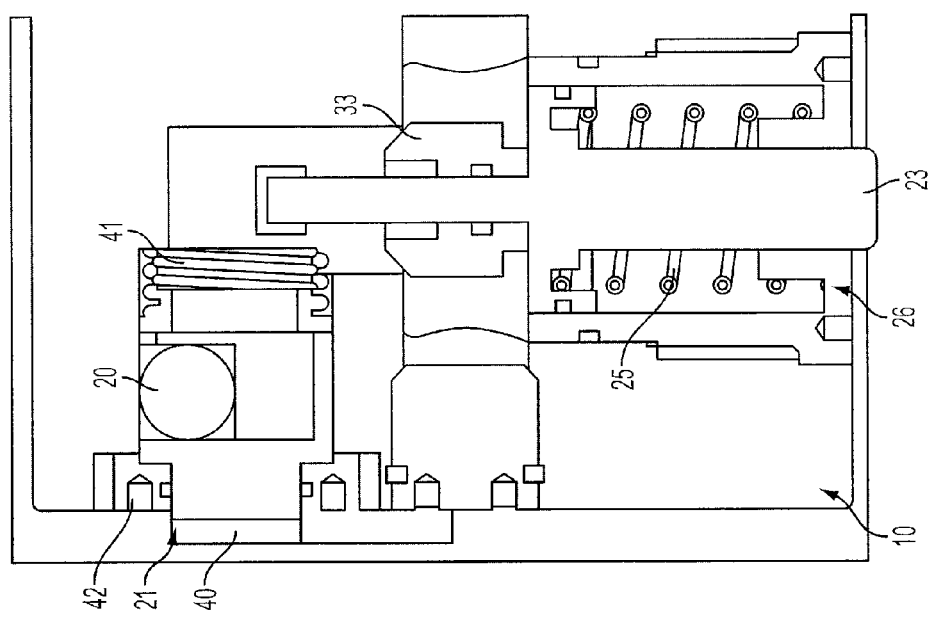
FIG. 2 is a cross sectional view of a portion of the pneumatic launch system of FIG. 1.

On its way to the ejector cylinders 19, the high pressure gas passes through the pitch valve 21 which provides various settings from full flow to no flow and ratios the gas delivered to the ejector cylinders 19. Refer to FIG. 2 for the cross sectional view of the pitch valve 21. The pitch valve 21 is designed to have a positive detent feature at each pitch setting position to prevent itself from moving during the ejection.

The pitch valve 21 is keyed to the retainer 42 by the spring 41 and is only released during manual resetting of the pitch position when the pitch valve is depressed with a screwdriver and rotated to the other pitch settings.

Referring back to FIG. 1, the disclosed valve manifold provides internal passage ways among the valves and integrates the valves with the pressure vessels, pressure/temperature transducer, dump/relief/check valves and solenoid control valves. The manifold provides an input port 38 from the pneumatic source 18, an output port 20 to the ejector cylinders 19, and an output port 12 to the RIFL actuator 11. Hook opening in the disclosed design is achieved by directing the high pressure gas to the top side 22 of the hook release piston 23 whose lower side 24 is open to atmosphere. This design provides a hook opening which is simpler and more efficient than if the lower side of the hook release piston is charged with the high pressure gas and has to be vented to achieve hook opening as in prior art. The disclosed valve manifold design optimizes the use of the available energy and is capable of achieving higher system performance such as faster valve response time and higher store ejection velocity.

Figure 3:
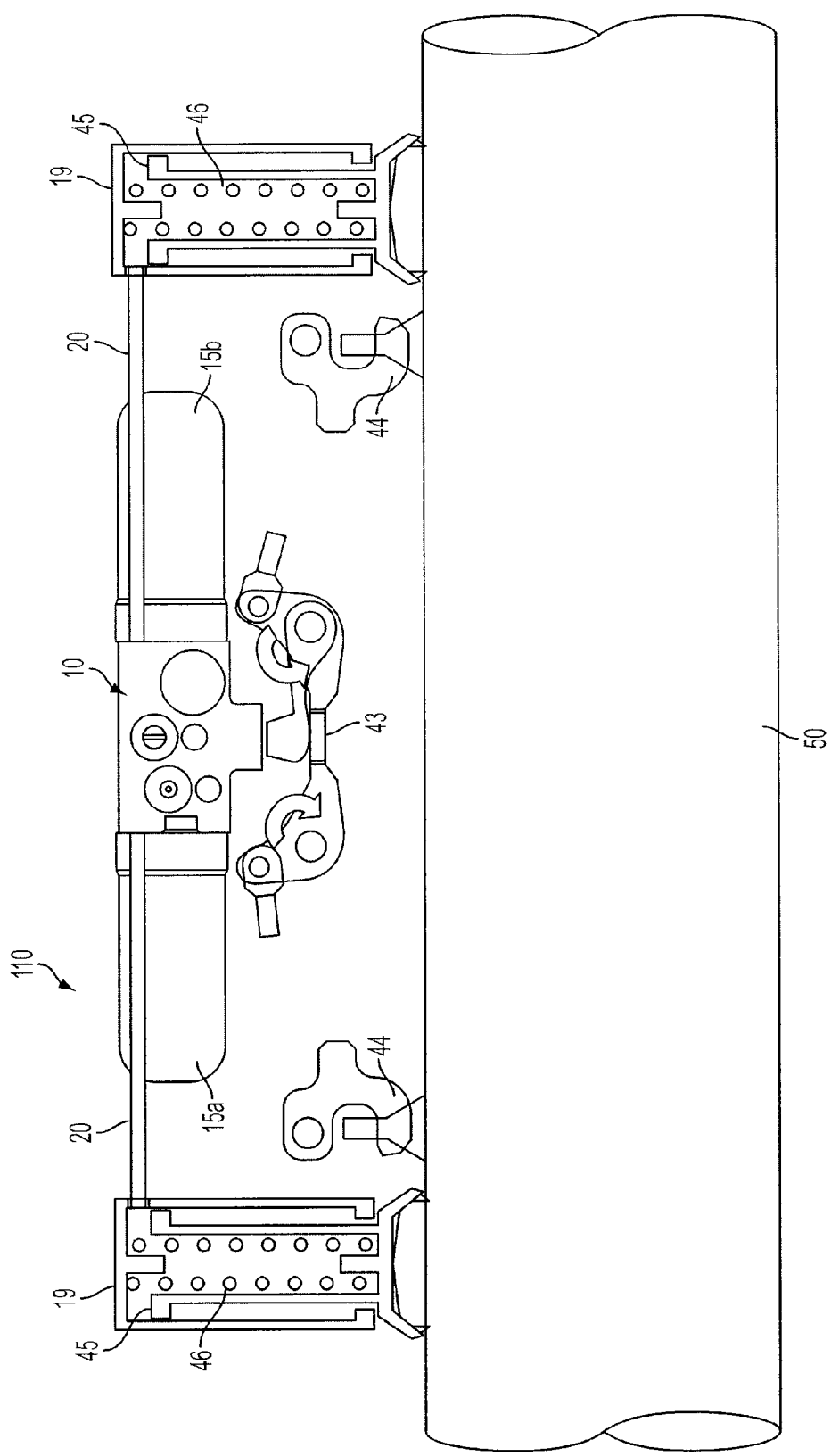
FIG. 3 is a schematic view of a portion of a pneumatic ejector rack that contains the pneumatic launch system of the present invention.

After the store is released, both solenoids 13 and 14 are de-energized. This causes them to vent and allow the RIFL actuator 11 and eject valve 35 to return to their original positions. As the eject solenoid valve 14 is de-energized, it vents the pilot chamber 28 of the eject valve 35 and allows the eject valve 35 to return to its closed position by the combined forces of spring 31 and the gas pressure in its main chamber 36 acting on the net area of the eject valve. As soon as this happens, the eject valve 35 blocks the high pressure gas flow to the ejector cylinders 19 and the hook release valve 26. This seals the high pressure gas immediately and opens the vent port 30 to the hook release valve 26 and the ejector cylinders 19. The ejector cylinders 19 then vent through the eject valve vent port 30 and the ejector pistons (45, as shown in FIG. 3) retract to their original positions by the return springs. The quick closure of the eject valve immediately after store release, ensures maximum residual pressure in the pressure vessels 15, which minimizes the recharge time of the pressure vessels 15 and the ready to fire time and increases the reliability of the pneumatic source 18 used to charge the racks. The RIFL actuator 11 in the retracted position opens the fire interlock switch which electrically disables the eject valve 35 and safes the rack. All valves, solenoids and ejector pistons are returned to their original positions after store release, ready for the loading of the next store.

FIG. 3 illustrates a schematic view of a portion of a pneumatic ejector rack 110 that contains the pneumatic launch system 10 of the current invention. Store 50 is suspended by the retention hook mechanism 43 at the retention hooks 44. The rack assembly also includes ejector cylinders 19 which include ejector pistons 45, each of which is normally retracted by a return spring 46. The pressure vessels 15a and 15b are in fluid communication with ejector cylinders 19 by means of a manifold and output ports 20. Upon command, high pressure gas from the pressure vessels 15a and 15b actuate eject valve 35 and hook release valve 26 of FIG. 1. This action causes the hook release piston 23 to interact with the hook release mechanism 43 to open retention hooks 44, thereby releasing store 50 (detailed view of the hook release mechanism is not shown). High pressure gas is then directed by sequence valve 33 of FIG. 1 to ejector cylinders 19 to eject store 50 away from the aircraft at a required exit velocity. After store release, the eject valve 35 of FIG. 1 is de-energized, opening a vent port 30 to the ejector cylinders 19. The ejector cylinders 19 then vent through the eject valve vent port 30, allowing each ejector piston 45 to retract to its original positions by the return spring 46. This enables the pneumatic ejector rack to be ready for loading of the next store.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A pneumatic launch system comprising
   an eject valve for forcibly ejecting a store from an aircraft,
   a hook release valve for releasing a hook of the store,
   wherein the eject valve communicates with the hook release valve to actuate the hook release valve for releasing the hook; and
   a pressurized vessel in fluid communications with the eject valve for setting a pressure level of fluid in the eject valve at a pressure level of the pressurized vessel,
   wherein the pressure level of the fluid in the eject valve actuates the hook release valve to release the hook, and releases fluid to sequentially eject the store;
   wherein the hook release valve includes a piston having high and low sides, and the fluid in the eject valve is directed to the high side of the piston, forcing the piston to interact with a hook release mechanism to release the hook, and movement of the piston opens a port for fluid flow to ejector cylinders for ejecting the store.

2. The pneumatic launch system of claim 1 wherein
   the pressure level of the fluid in the eject valve is effective in shortening a period of time to release the hook and to eject the store.

3. The pneumatic launch system of claim 1 wherein a lower side of the hook release valve and piston is open to the atmosphere.

4. The pneumatic launch system of claim 1 wherein the eject valve is configured to, when at the closed position, seal the pressurized vessels, vent the hook release valve, and vent the ejector cylinders through a vent port on the eject valve.

5. The pneumatic launch system of claim 1 wherein the eject valve is normally closed by a spring force and the pressure level of the fluid in a main chamber of the eject valve.

6. The pneumatic launch system of claim 1 wherein the eject valve is activated by energizing an eject valve solenoid which releases the fluid from the pressure vessel to a pilot chamber of the eject valve.

7. The pneumatic launch system of claim 6 wherein the eject valve is deactivated by de-energizing the eject valve solenoid which vents the pilot chamber of the eject valve.

8. The pneumatic launch system of claim 1 wherein the release of fluid to eject the store is controlled by an adjustable pitch valve which provides various pitch settings and ratios to control the fluid delivered to eject the store.

9. The pneumatic launch system of claim 1 wherein the system provides an input port from a pneumatic source, an output port to ejector cylinders, and an output port to a Reversible In-Flight Lock (RIFL) actuator which enables and disables the eject valve.

10. The pneumatic launch system of claim 9 wherein the system includes a RIFL solenoid to control the RIFL actuator.

11. A method of ejecting a store from an aircraft comprising the steps of:
    (a) maintaining a pressure level of an eject valve at a pressure level of a pressurized vessel, wherein the pressurized vessel communicates fluidly with the eject valve;
(b) releasing high pressure fluid from the pressurized vessel to the eject valve, causing the eject valve to activate, and transmitting the pressure maintained in the eject valve to a hook release valve;
(c) actuating, by the hook release valve, a hook release mechanism of the store, after transmitting the pressure level from the eject valve; and
(d) sequentially releasing fluid from the eject valve to ejector cylinders for ejecting the store.

12. The method of claim 11 wherein
step (b) of transmitting the pressure level includes directing fluid from the eject valve to a piston of the hook release valve; and
step (c) of actuating includes forcing the piston to interact with a hook release mechanism to release a retention hook, the action of the piston opens a port for fluid communication between the eject valve and the ejector cylinders.

\* \* \* \* \*